United States Patent
Guo et al.

(10) Patent No.: US 9,351,332 B2
(45) Date of Patent: May 24, 2016

(54) METHOD, SYSTEM, AND DEVICE FOR IMPLICIT DETACHMENT

(75) Inventors: Xiaolong Guo, Shenzhen (CN); Lan Liu, Shenzhen (CN); Wanqiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 12/621,482

(22) Filed: Nov. 18, 2009

(65) Prior Publication Data

US 2010/0061331 A1    Mar. 11, 2010

Related U.S. Application Data

(63) Continuation of application No. PCT/CN2009/071448, filed on Apr. 24, 2009.

(30) Foreign Application Priority Data

Apr. 30, 2008  (CN) .......................... 2008 1 0067042
Aug. 20, 2008  (CN) .......................... 2008 1 0212427

(51) Int. Cl.
*H04W 72/04* (2009.01)
*H04W 76/06* (2009.01)
*H04W 76/04* (2009.01)

(52) U.S. Cl.
CPC .......... *H04W 76/068* (2013.01); *H04W 76/046* (2013.01)

(58) Field of Classification Search
CPC ... H04W 72/04; H04W 72/044; H04W 48/16; H04L 12/28
See application file for complete search history.

(56) References Cited

U.S. PATENT DOCUMENTS

| | | |
|---|---|---|
| 2005/0119008 A1* | 6/2005 | Haumont .................... 455/456.1 |
| 2005/0265279 A1* | 12/2005 | Markovic et al. ............. 370/328 |
| 2007/0091846 A1* | 4/2007 | Kim et al. ...................... 370/331 |
| 2007/0218926 A1* | 9/2007 | Zhuang et al. ................ 455/466 |
| 2008/0014959 A1* | 1/2008 | Karlsson ....................... 455/455 |
| 2008/0037468 A1 | 2/2008 | Zisimopoulos et al. |
| 2008/0039086 A1* | 2/2008 | Gallagher et al. ......... 455/435.1 |

(Continued)

FOREIGN PATENT DOCUMENTS

| CN | 1992958 A | 7/2007 |
|---|---|---|
| CN | 101001262 A | 7/2007 |

(Continued)

OTHER PUBLICATIONS

English Translation of the Written Opinion of the International Searching Authority, PCT/CN2009/071448, date of mailing Aug. 6, 2009, 5 pages.

(Continued)

*Primary Examiner* — Anez Ebrahim
(74) *Attorney, Agent, or Firm* — Huawei Technologies Co., Ltd.

(57) ABSTRACT

Embodiments of the present invention disclose a method of implicit detachment and related system and device. The method comprises: the first device receives a request message that carries implicit detachment indication from the second device; and the first device performs implicit detachment or restores the second device to original status according to the indication. Embodiments herein further disclose a system and device for implicit detachment. In embodiments herein, implicit detachment process is triggered through MRT expiry information.

17 Claims, 7 Drawing Sheets

(56) References Cited

U.S. PATENT DOCUMENTS

| | | | |
|---|---|---|---|
| 2008/0102831 A1* | 5/2008 | Ore | 455/435.1 |
| 2008/0220800 A1* | 9/2008 | Gunaratnam et al. | 455/510 |
| 2009/0111458 A1* | 4/2009 | Fox et al. | 455/422.1 |
| 2010/0137016 A1* | 6/2010 | Voyer | 455/522 |

FOREIGN PATENT DOCUMENTS

| | | |
|---|---|---|
| CN | 101064923 A | 10/2007 |
| CN | 101064953 A | 10/2007 |
| CN | 101075947 A | 11/2007 |

OTHER PUBLICATIONS

Nortel, "MRT handling with ISR," 3GPP TSG SA WG2 Architecture—S2#59, S2-073513, Temporary Document for Discussion and Approval, XP-007912556, Aug. 27-31, 2007, 4 pages, Helsinki, Finland.

Huawei, "Discussion on the trigger to deactivate ISR," 3GPP TSG SA WG2 Meeting #60, S2-073980, Temporary Document for Discussion, XP-050260846, Oct. 8-12, 2007, 2 pages, Kobe, Japan.

Huawei, "Procedure of ISR Deactivation," 3GPP TSG SA WG2 Meeting #60, S2-073981, Temporary Document for Discussion and Approval, XP-050260847, Oct. 8-12, 2007, 4 pages, Kobe, Japan.

3GPP, "General Packet Radio Service (GPRS) enhancements for Evolved Universal Terrestrial Radio Access Network (E-UTRAN) access (Release 8)," 3GPP Technical Specification 23.401, V8.1.0, Mar. 2008, 171 pages.

Huawei, "Introduction of ISR (Idle-mode Signalling Reduction)," 3GPP TSG CT WG1 Meeting #52, C1-081416 (Revision of C1-081030), Document for Information and Approval, XP-050028665, Apr. 7-11, 2008, 3 pages, Jeju Island, Korea.

Vodafone, "P-CR (TS24.301), Adding E-UTRAN Deactivate ISR Timer description," 3GPP TSG CT WG1 Meeting #56, C1-084765, Document for Approval, XP-050309762, Nov. 10-14, 2008, 6 pages, Shanghai, P.R. China.

3GPP, "General Packet Radio Service (GPRS) enhancements for Evolved Universal Terrestrial Radio Access Network (E-UTRAN) access (Release 8)," 3GPP Technical Specification 23.401, V8.4.1, Dec. 2008, 220 pages.

Supplementary European Search Report, European Application No. 09737677.6-2413, Dated: Apr. 20, 2010, 11 pages.

Chinese Office Action, Chinese Application No. 200810212427.2, Applicant: Huawei Technologies Co., Ltd., Dated: Mar. 31, 2011, 9 pages.

First office action issued in corresponding European patent application No. 09737677.6, dated Jul. 10, 2012, 5 pages total.

Office action issued in corresponding Chinese application No. 200980113853.3, dated Feb. 27, 2013, and an English translation thereof, total 17 pages.

3GPP TSG SA WG2 Architecture—SA2#55 S2-063702, "Clarification on "signaling free" idle mode solution", Nokia, Oct. 23-27, 2006, total 2 pages.

Office action issued in corresponding European application No. EP09737677.6, dated Apr. 17, total 5 pages.

* cited by examiner

METHOD, SYSTEM, AND DEVICE FOR IMPLICIT DETACHMENT

CROSS-REFERENCE TO RELATED APPLICATIONS

This application is a continuation of International Application Serial No. PCT/CN2009/071448, filed on Apr. 24, 2009, which claims priority to Chinese Patent Application No. 200810067042.1 filed on Apr. 30, 2008 and Chinese Patent Application No. 200810212427.2, filed on Aug. 20, 2008, all of which are hereby incorporated by reference in their entireties.

FIELD OF THE INVENTION

The present invention relates to a technical field of mobile communication, and in particular, to a method, system, and device for implicit detachment.

BACKGROUND OF THE INVENTION

The Universal Mobile Telecommunication System (UMTS) describes a technical standard of third-generation radio communication network, which is defined by the Third Generation Partnership Project (3GPP). A UMTS network consists of a core network and an access network. The core network includes Circuit Switching (CS) or Packet Switching (PS) domains. The CS domain provides circuit-switched services, such as voice. The PS domain provides packet-switched services, such as Internet access.

Figure 1:
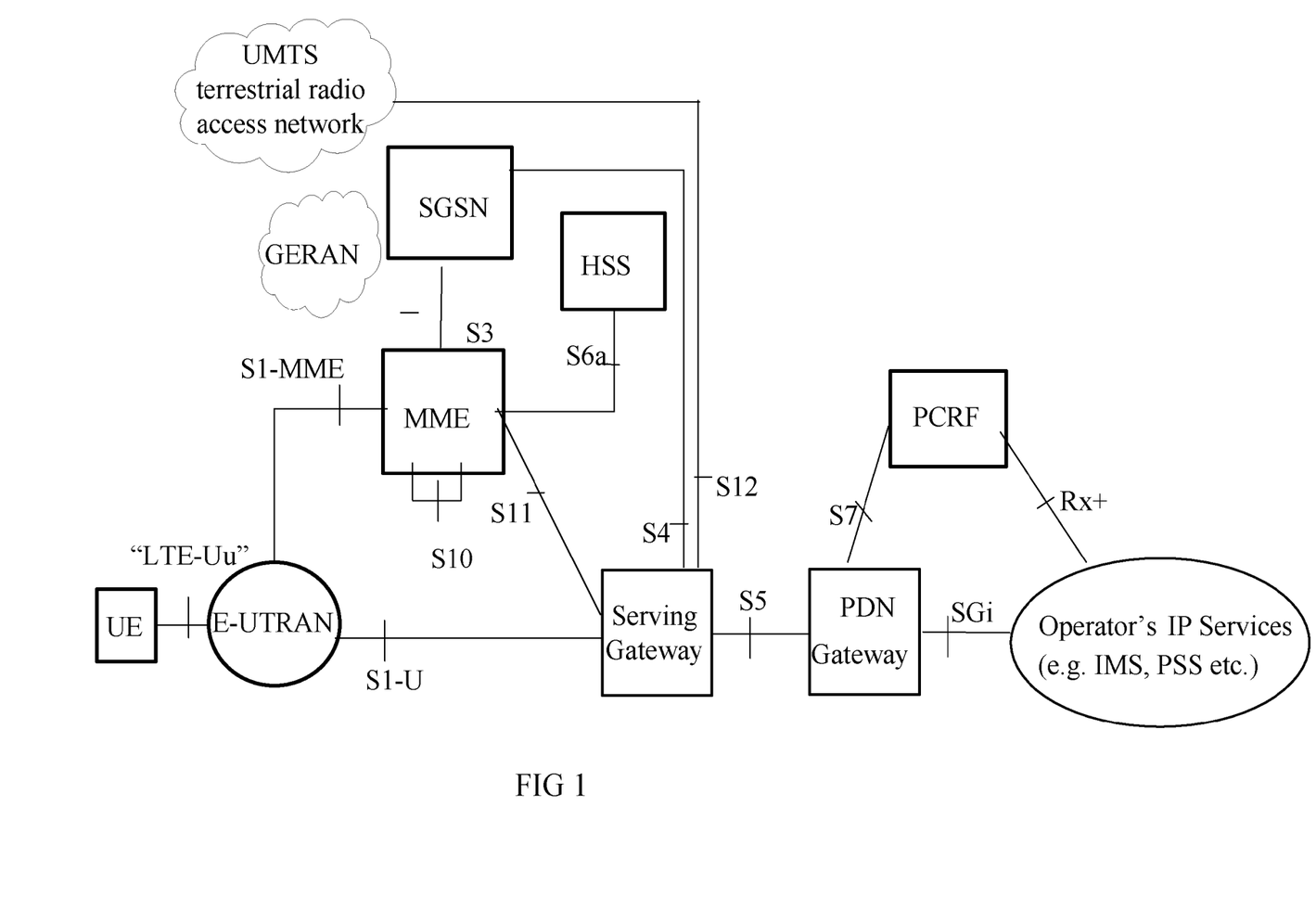
FIG. 1 shows the structure of a UMTS and SAE/LTE network.

Currently, in the Long Term Evolution (LTE)/System Architecture Evolution (SAE) technology, LTE is intended to provide a low-cost network that can reduce time delay, increase user data rates, and improve system capacity and coverage, and deliver PS domain services over IP networks. FIG. 1 illustrates the LTE/SAE network architecture and functions.

The Mobility Management Entity (MME) is designed to store User Equipment (UE) mobility management contexts, such as user identity, mobility management status, and location, to process Non Access Stratum (NAS) signaling, and to ensure the security of NAS signaling.

An SAE gateway (SAE GW) consists of two parts: Serving Gateway (S-GW) and Packet Network Gateway (P-GW). As two logical entities, S-GW and P-GW may exist as one or more physical entities.

The S-GW stores user plane contexts, such as a UE's IP address and routing information, monitors data for validity, and routes packet data. As an interface responsible for communication between the S-GW and MME, S11 exchanges information relating to UE mobility management and session control.

The P-GW, as a User plane anchor, is responsible for connecting UE to a packet data network. The entity implements packet routing and forwarding, policy and charging control, and user-specific packet filtering.

Figure 2:
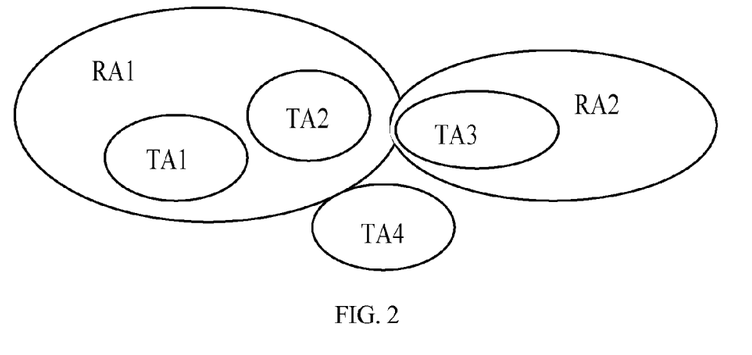
FIG. 2 shows 2G/3G and LTE deployment.

In existing 2G/3G networks and LTE/SAE networks as shown in FIG. 2, the first and second Routing Areas (RA) indicate RAs of existing 2G/3G networks. The UE will initiate a Routing Area Update (RAU) process when it changes RA. The UE will initiate network registration whenever it changes RAT, on which the UE camps. Frequent network registration processes due to this camped RAT change may cause a huge waste of air interfaces. The first, second, third and fourth Tracking Areas (TAs) describe the TAs of an LTE/SAE. When a multi-mode UE moves in a network and enters the first RA, to allow the network to page the UE within the RAT, the UE needs to register with the SGSN of the 2G/3G network. When entering the first TA, the UE needs to register with the MME of the LTE/SAE network. When moving from the first TA to the first RA, the UE needs again to register with the SGSN of the 2G/3G network. Consequently, frequent registrations may cause a considerable amount of registration signaling overload.

Within the framework of conventional technology, the UE can activate an Idle State Signaling Reduction (ISR) process, i.e. the UE first initiates an attach procedure and registers with the 2G/3G or SAE network. When moving from the SAE network or 2G/3G network or from the 2G/3G network to the SAE network, the UE needs to register with the other RAT, so that the UE registers with both access networks. Then, while moving within the registered RA or a TA of either network, the UE does not need to launch any registration process, except that the UE initiates periodical location update (RAU/TAU).

Before the ISR is activated, the UE only registers with the 2G/3G or SAE network. In this situation, two timers (periodical location update timer and Mobile Reachable Timer, MRT) are used to maintain the UE attach status.

When the UE is attached to a network, the UE retains a periodical location update timer, while the network retains an MRT. The MRT in the network is slightly longer than the periodical location update timer in the UE.

When the UE goes to idle mode or switches to another network, the network MRT and the periodical location update timer at the UE side starts from their initial values; when the UE goes to active mode, both the timers stop; when the periodical location update timer at the UE side expires, the UE will initiate a periodical location update process on the network.

If the network MRT receives no periodical location update message from the UE, the network can detach the UE in an implicit manner immediately or within a preset period of time, that is, the network will delete the UE's Mobility Management (MM) and Session Management (SM) contexts.

When the ISR is activated, the UE registers with both the 2G/3G and SAE network while it only camps on one RAT. In this situation, four timers—periodical UE location update timer for RAT1, periodical UE location update timer for RAT2, MRT timer for the first network RAT, and MRT timer for the second network RAT—are used to maintain the UE attach status.

If the periodical location update timer for RAT1, where the UE camps, expires, a location update procedure is initiated.

If the periodical location update timer for RAT1 expires, but the UE now camps on RAT2, the UE needs to record the expiry information relating to the periodical location update timer for RAT1 and update its location as soon as the UE moves back to RAT1.

When the UE camps on RAT2, the expiry of the periodical location update for RAT1 will not cause the UE to change its camped RAT or to initiate location update. When the network MRT for RAT1 expires, UE contexts will not be deleted. Instead, a longer timer 2 is started.

When the Timer 2 for RAT1 expires, the network will contact RAT2. When RAT2 agrees to detach the UE, the network will detach the UE in an implicit manner. When the MRT for RAT1 expires but Timer 2 for RAT1 does not expire, upon receiving downlink data, the S-GW will send downlink data notification. In this situation, the RAT Core Network (CN) node (MME or SGSN) relating to the expired MRT will not implement the paging process, because the UE does not camp on the RAT, then the RAT node (MME or SGSN) relating to said expired MRT returns downlink data notification to the S-GW.

The inventor has identified the following defects in the existing technology during the implementation of the present technology.

In an SAE network, if the ISR is not activated, and if the UE is idle and the MRT expires at MME or SGSN, the S-GW would still send downlink data notification to the MME to trigger MME paging when download data reaches the S-GW, as MME or S-GW is a separate node and the S-GW serves as the user plane termination point in the idle mode. However, the MME continuously returns Deny messages, thus causing signaling overhead and wasting network resources. If the ISR is activated, the S-GW needs to send downlink data notification to both the SGSN and MME, which triggers SGSN and MME to page UE. If the UE camps on RAT2 while the MRT for RAT1 expires; or if the UE camps on RAT1 while the MRT for RAT2 expires, for this idle UE, each time the S-GW receives download data, it will send signaling to the MME and SGSN, thus causing the RAT node (MME or SGSN) whose MRT expires to receive signaling continuously and return failure messages, which in turn may cause considerable overhead. In addition, if MRTs on both RAT nodes expire, the present invention provides no suitable mechanism to detach the UE in an implicit manner.

SUMMARY OF THE INVENTION

A method, system and device for implicit detachment are provided in an embodiment of the present invention to promptly detach idle UEs in an implicit manner, so as to prevent the S-GW from continuously sending messages to control node for these idle UEs, reduce signaling overhead, and save network resources.

A method of ISR deactivation is provided in an embodiment of the present invention to deactivate the ISR through the process in which the new MME obtains context from the old MME or the new SGSN obtains context from the old SGSN, so as to prevent the S-GW from continuously sending messages to these idle UEs, reduce signaling overhead, and save network resources.

A method and device for deactivating ISR are provided in an embodiment of the present invention to reduce needless paging and extra signaling.

A method of supporting ISR and allowing/maintaining ISR is provided in an embodiment of the present invention to prevent the S-GW from deactivating ISR again and thus increasing signaling overload because the node does not support the function.

A method of implicit detachment is provided in an embodiment of the present invention, including:
receiving, by the first device, a request message that carries implicit detachment indication from the second device; and
performing, by the first device, implicit detachment, or restoring the second device to its original status according to the indication.

A method of ISR deactivation is provided in an embodiment of the present invention, including:
deactivating ISR, when an MME obtains a context from an old MME; or
deactivating ISR, when an SGSN obtains a context from an old SGSN.

A method of ISR deactivation is provided in an embodiment of the present invention, including:
deactivating, by network of a first RAT, ISR for the UE when Timer 2 of the network's first RAT expires; or setting, by the UE, the first RAT as detached or ISR deactivated status when the deactivation timer for the UE's first RAT expires.

A device for ISR deactivation is provided in an embodiment of the present invention, including:
a deactivation unit, adapted to be used by the network of the first RAT to deactivate ISR for the UE when Timer 2 for RAT1 of the current network expires; or
a setting unit, adapted to be used by a UE to set the first RAT to detach or deactivate ISR when the UE's first RAT deactivation timer expires.

A method of RAT deactivation is provided in an embodiment of the present invention, including:
connecting, by a UE, to a first RAT;
triggering, by the first RAT, the deactivation of the second RAT when the timer which counts the UE camping on the first RAT expires.

A method of supporting ISR and permitting activation or maintaining ISR in an embodiment of the present invention, including:
receiving, by the S-GW, a request message from a first RAT or a second RAT node; and
determining, by the S-GW, whether to activate, maintain or deactivate the ISR according to the received message;
where the request message includes request message of creating bearer or request message of updating bearer that carries information regarding whether the first RAT or the second RAT node supports ISR or whether an ISR message can be created.

A system for implicit detachment is provided in an embodiment of the present invention, including:
a second device, adapted to send a request message that carries implicit detachment indication to a first device; and
the first device, adapted to receive a request message from the second device and perform implicit detachment according to the indication.

A device for implicit detachment is provided in an embodiment of the present invention, including:
a record unit, adapted to record whether the request message carries implicit attachment indication; and
a detection unit, adapted to perform implicit detachment or restore the original status according to the detection indication.

According to embodiments of the present invention, the S-GW stops sending downlink data notifications to the MME or SGSN and detaches the idle UE in an implicit manner after the MRT of the MME and/or SGSN expires and the S-GW triggers an implicit detachment process or receives downlink data, thus preventing the S-GW from continuously sending messages to this idle UE, so that signaling overhead is reduced, and network resources are saved.

According to embodiments of the present invention, the first RAT node obtains context from the old node of the first RAT and triggers ISR deactivation when an ISR-activated UE connects to the first RAT node. In this way, the second RAT can still obtain information relating to the new node of the first RAT.

The present embodiment sets a deactivation timer for the UE and/or network of the first and second RATs. When the network or UE deactivation timer of one RAT expires, the UE is promptly detached from that RAT. Alternatively, this embodiment sets a periodical location update timer of the first RAT for the UE. When counter of the timer's expiry reaches the preset threshold, the second RAT is detached promptly, helping reduce needless paging and extra signaling.

According to embodiments of the present embodiment, the S-GW is notified with respect to whether the S-GW supports or permits ISR activation, when the MME or SGSN creates bearer with the S-GW. The S-GW accurately determines whether to activate or maintain ISR. This prevents the S-GW from deactivating, due to the reason that some nodes do not support the functionality, ISR again. As a result, the signaling overload is reduced and network resources are saved.

DETAILED DESCRIPTION OF THE EMBODIMENTS

To clarify the purposes, technical solutions, and advantages of the invention, the following section will detail the embodiments of the present invention based on figures.

Available solutions for detaching a UE from a network through implicit detachment under the SAE architecture includes:

solution 1: An implicit detachment process is triggered by notifying the S-GW voluntarily when the MME and/or SGSN MRT expires; or solution 2: The S-GW is not voluntarily notified when the MME and/or SGSN MRT expires. Instead, only in the case of downlink data arrives, the S-GW sends downlink data notification to the MME and the SGSN, and then to triggers an implicit detachment process.

If ISR is not activated and the MME or SGSN MRT expires, the MME or SGSN will notify the S-GW immediately or after a preset time of period. Upon receiving an MRT expiry message from the MME or SGSN, the S-GW sets the UE in MME or SGSN as "paging not allowed", "out of coverage" or "semi-detached" and then initiates an implicit detachment process immediately or after a preset period of time; if the ISR is activated and the MME or SGSN MRT has expired or had expired after a preset period of time, the MME or SNSN notifies the S-GW. Upon receiving an MRT expiry message from RAT1, the S-GW does not send downlink data notification to RAT1 but notifies RAT2. When detecting that both the two RAT nodes send MRT expiry messages, the S-GW will initiate an implicit detachment process immediately or after a preset time of period.

Figure 3:
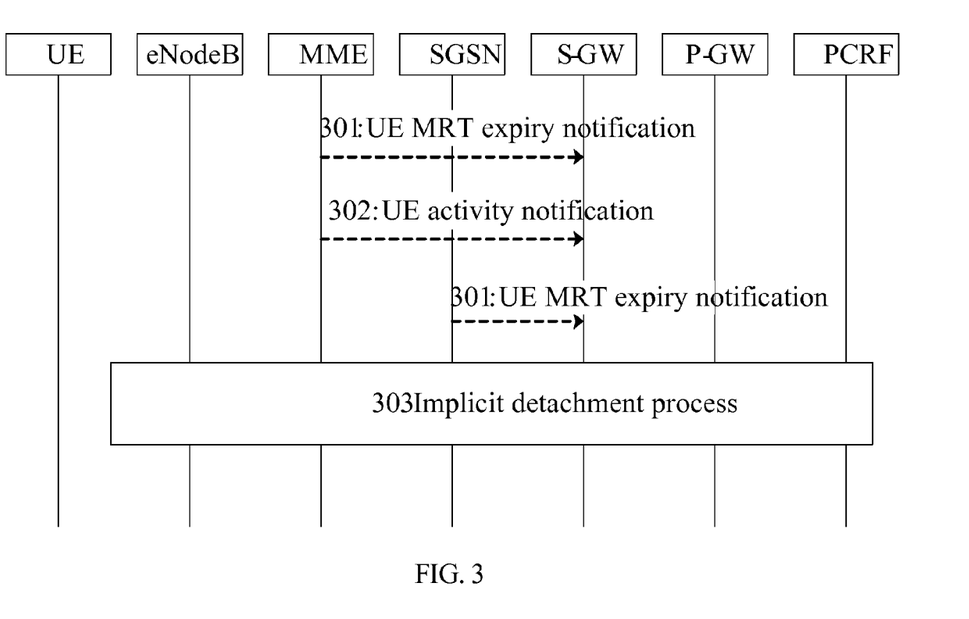
FIG. 3 provides a flowchart of a method of implicit detachment described in embodiment 1 of the present invention.

Embodiment 1 of the present invention provides a method. According to the method, the MME or SGSN notifies the S-GW of implicit detachment when the MRT expires. ISR activation is taken as an example, as shown in FIG. 3. The method includes the following steps.

Step 301: If an MME or SGSN MRT expires, the MME or SGSN sends MRT expiry information, e.g. via UE MRT Expiry Notification message, or other messages such as Update Bearer Request message, to the S-GW. The MME clears a Paging Proceed Flag (PPF_MME) to indicate that the MME's MRT expires, and that the UE is in semi-detached state or out of LTE coverage. When the SGSN clears a PPF_SGSN to indicate that the UE's SGSN MRT expires, the UE is in semi-detached state or out of LTE coverage. Thus, when receiving downlink data again, the S-GW no longer sends Downlink Data Notification message to the MME or SGSN which indicates its MRT expiry.

Step 302: If the UE connects again to an MRT expiry RAT node, for example, an MME whose MRT ever expired, the RAT node will send another UE activity information via a new message such as UE Activity Notification or via an old message such as Update Bearer Request to the S-GW. The S-GW will reset the corresponding PPF. If the MME sends UE activity information to the S-GW, the S-GW sets PPF_MME to indicate that the S-GW can send downlink data notification to the MME to trigger the MME paging when receiving downlink data again.

Step 303: When detecting that MRTs from the MME and SGSN nodes both expire, that is, both MME and SGSN are "paging not allowed" (e.g., PPF_MME and PPF_SGSN are both cleared), the S-GW will initiate an implicit detachment process immediately or after a preset period of time.

Another method of implicit detachment is provided. According to the method, the MME or SGSN does not notify the S-GW voluntarily when the MME or SGSN MRT expires. Instead, only when downlink data reaches the S-GW, the S-GW sends Downlink Data Notification to the MME or SGSN. When the ISR is not activated and the S-GW receives Downlink Data Notification Reject message from the MME or SGSN, with the cause value being MRT expiry, the S-GW will initiate an implicit detachment process immediately or after a preset period of time. After the ISR is activated and the S-GW receives "downlink data notification denied" message from MME or SGSN, with the cause value being MRT expiry, the corresponding RAT will be recorded as "paging not allowed". When detecting that both the two RATs are in the "paging not allowed" state, the S-GW will initiate an implicit detachment process immediately or after a preset period of time.

Figure 4:
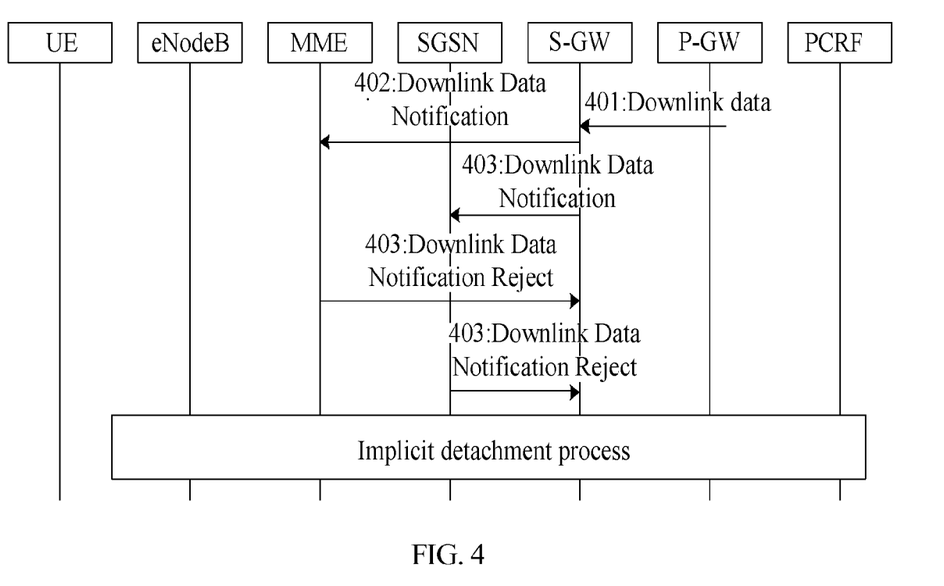
FIG. 4 provides a flowchart of a method of implicit detachment described in embodiment 2 of the present invention.

Embodiment 2 of the present invention provides a method whereby the MME or SGSN does not notify the S-GW voluntarily but triggers a process of implicit detachment when the MRT expires. As shown in FIG. 4, Embodiment 2 includes the following steps:

Step 404: The S-GW receives downlink data.

Step 402: When the ISR is not activated, the S-GW sends downlink data notification to the SGSN or MME; when the ISR is activated, the S-GW sends downlink data notification to the SGSN and MME.

Step 403: When the ISR is not activated, the S-GW receives information of Downlink Data Notification Reject, or information of MRT expiry or similar information contained in Update Bearer Request message by carrying a cause value or a new information element from the MME or SGSN. If the S-GW determines that the MME or SGSN MRT expires or is in the state of semi-detached, the S-GW triggers an implicit detachment process. When the ISR is activated and the S-GW receives "Downlink Data Notification Reject" message with the cause value being MRT expiry from both the SGSN and MME, the S-GW triggers an implicit detachment process.

When the ISR is not activated and the S-GW only receives "Downlink Data Notification Reject" message with the cause value being MRT expiry from the MME or SGSN node, the S-GW records that the corresponding MME or SGSN MRT expires or the UE is semi-detached from the corresponding MME or SGSN node in an implicit manner. In this situation, the S-GW no longer sends downlink data notification to the corresponding MME or SGSN within a given time of period. When the UE connects again to the MME or SGSN, the MME or SGSN node sends signaling to the S-GW and the S-GW restores the status of the UE at the MME or SGSN. When the ISR is activated and it is detected that the MRTs of the MME and SGSN both expire or the UE is semi-detached for both Rats, the S-GW initiates an implicit detachment process immediately or after a preset period of time.

Figure 5:
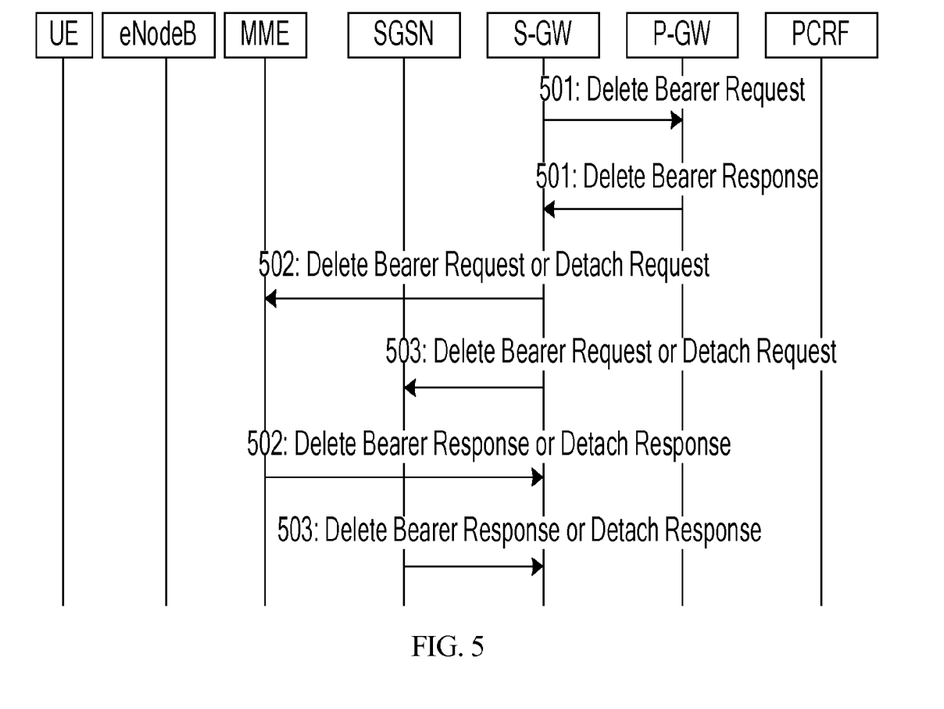
FIG. 5 provides a flowchart of method 1 of implicit detachment described in embodiment 3 of the present invention.

Embodiment 3 of the present invention provides a process of implicit detachment, which can be implemented by adopting the following methods, including:

Method 1: As shown in FIG. 5, the S-GW sends Delete Bearer Request message to one or more P-GWs for the UE. After deleting bearer request for the UE, if the ISR is not activated, the S-GW sends a Detach Request or Delete Bearer Request message to the MME or SGSN, requesting that the MME or SGSN to detach the UE or delete all bearers of the UE. When the ISR is activated, the S-GW sends a Detach Request or Delete Bearer Request to both the MME and SGSN, requesting that the MME and SGSN to detach the UE or delete all bearers of the UE. This method includes:

Step 501: The S-GW sends Delete Bearer Request message to a P-GW. The P-GW sends a Delete Bearer Response to the S-GW.

Step 502: The S-GW sends a Delete Bearer Request or Detach Request message to the MME and/or SGSN. The MME and/or SGSN send a Delete Bearer Response or Detach Response message to the S-GW.

Figure 6:
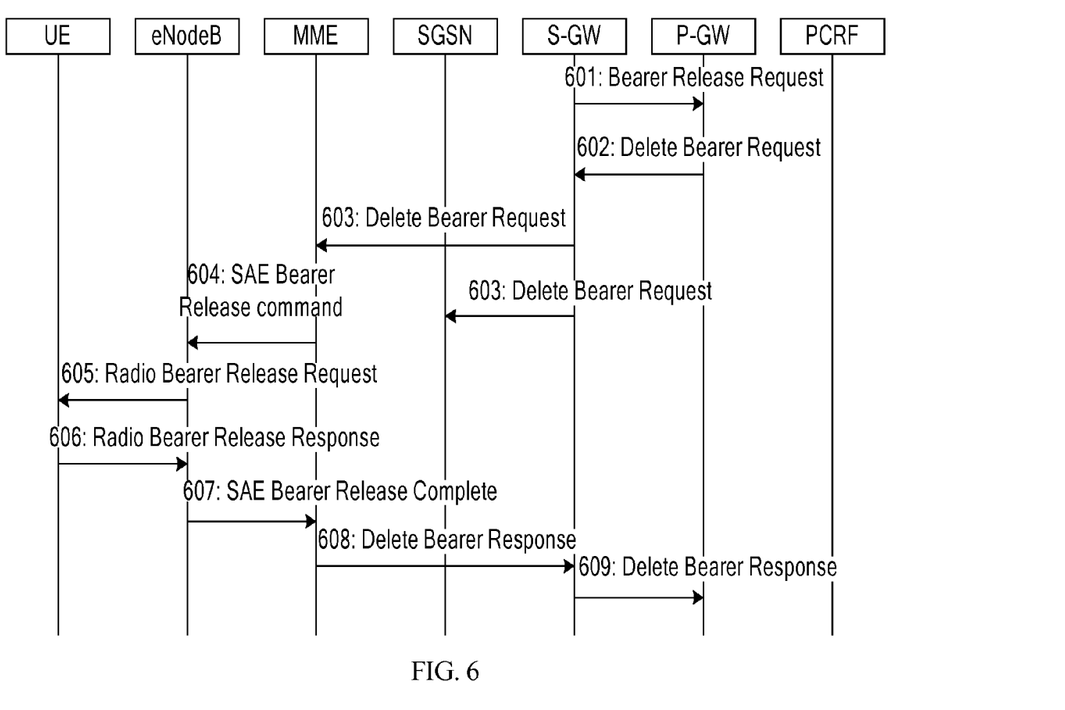
FIG. 6 provides a flowchart of method 2 of implicit detachment described in embodiment 3 of the present invention.

Method 2: As shown in FIG. 6, the S-GW sends release bearer request to the P-GW. The P-GW initiates a process of deleting the bearer. Specifically, upon receiving Delete Bearer Request from the P-GW, the S-GW sends Delete Bearer Request message to the SGSN and MME, and the MME initiates bearer release process; the SGSN initiates a radio access bearer (RAB) release process. When all bearers are released, the UE status at the MME becomes detached.

601: The S-GW sends a bearer release request to the P-GW.

602: The S-GW receives Delete Bearer Request from the P-GW.

603: The S-GW sends Delete Bearer Request to the MME and/or SGSN. (The process of deleting bearer at the SGSN side is omitted. Discussed below is the process of MME bearer release.)

604: The MME sends an SAE bearer release command to an eNodeB.

605: The eNodeB sends a radio bearer release request for the UE.

606: The UE returns a radio bearer release response to the eNodeB.

607: The eNodeB sends "SAE bearer release complete" to the MME.

608: The MME sends a Delete Bearer Response to the MME.

609: The S-GW sends a Delete Bearer Response to the P-GW.

Method 3: When the ISR is not activated, the S-GW sends a Detach Request or Delete Bearer Request message to the MME or SGSN respectively. The MME or SGSN initiates a delete bearer or detachment process respectively. When the ISR is activated, the S-GW sends a Detach Request or Delete Bearer Request to the MME and SGSN respectively. The MME and SGSN initiate a delete bearer or detach process respectively.

In this embodiment of the present invention, the S-GW stops sending Downlink Data Notifications to the MME or SGSN and detaches idle UEs in an implicit manner after the MRT of the MME and/or SGSN expires and the S-GW triggers an detachment process or receives downlink data, thus preventing the S-GW from continuously sending messages for this idle UE, as a result, signaling overhead is reduced, and network resources are saved.

Possible solutions for deactivating the ISR in a 2G/3G or SAE network include:

One is to trigger ISR deactivation when the MME or SGSN obtains context from the old MME or SGSN; the other is that the UE deactivates another RAT after it camps on one RAT for a long time.

Embodiment 4 of the present invention relates to a method of triggering ISR deactivation when the MME or SGSN obtains context from the old MME or SGSN.

If a UE has activated ISR and the 2G/3G and SAE network bearers are synchronized, namely, the UE sets Temporary Identity used in Next Update (TIN) to "RAT-related TMSI", this indicates that the UE always uses the TMSI assigned by the access RAT as its primary TMSI. When getting access to a 2G/3G network, the UE uses the TMSI assigned by the 2G/3G network (i.e. P-TMSI) as the primary TMSI. When getting access to an SAE network, the UE uses the TMSI assigned by the SAE network (i.e., GUTI) as the primary TMSI. When the old MME and SGSN bearers for an ISR-activated UE are synchronized and the UE moves from an SGSN to an new MME, the UE will use Global Unique Temporary Identity (GUTI) for access to the MME. If the MME obtains context from the old MME, the SGSN cannot obtain information relating to the new MME; or when the old MME and SGSN bears are synchronized and the UE moves from the old MME to the new SGSN, the new SGSN obtains context from the old SGSN. As a result, the old MME cannot obtain information relating to the new SGSN. In either of the above situations, the two RAT access nodes (MME/SGSN or old MME/SGSN) cannot be associated. If a new association is established between the two RAT nodes, overload signaling is required.

Therefore, the ISR should be deactivated if a new MME or a new SGSN obtains context from the old SGSN. UE's access to an MME is taken as an example. The deactivation process is detailed below:

If the S-GW remains unchanged, the S-GW receives an Update Bearer Request from the MME, and the message does not carry ISR information or carries information relating to ISR deactivation. The S-GW sends a Delete Bearer Request to the SGSN to delete the UE context from the SGSN. The ISR is deactivated in the SGSN. If the S-GW changes, the S-GW receives an Update Bearer Request from the old MME, and the message does not carry ISR information or carries information relating to ISR deactivation; the old S-GW sends a Delete Bearer Request to the SGSN to delete the UE context from the SGSN. The ISR is deactivated in the SGSN.

Figure 7:
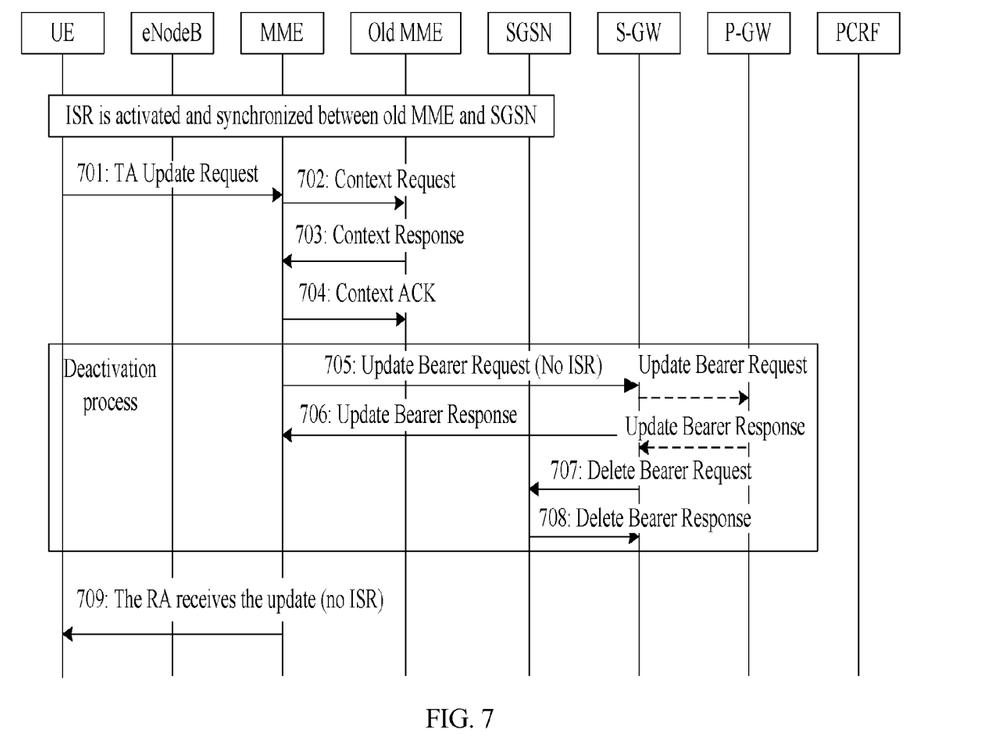
FIG. 7 provides a flowchart of method 1 of ISR activation described in embodiment 4 of the present invention.

FIG. 7 shows the specific ISR deactivation process when the S-GW remains unchanged, including the following steps:

Step 701: A UE sends a TA Update Request message to the MME.

Step 702: The MME sends a Context Request message to the old MME, and updates UE association contexts on the SGSN and MME.

Step 703: The old MME returns a Context Response to the MME.

Step 704: The MME sends a Context Acknowledgment message to the old MME.

Step 705: The MME sends an Update Bearer Request to the S-GW. The message does not carry ISR information or carries information relating to ISR deactivation.

Step 706: The S-GW receives the Update Bearer Request from the MME. The message does not carry ISR information or carries information relating to ISR deactivation.

Step 707: The S-GW sends an Update Bearer Response to the MME.

Step 708: The S-GW sends Delete Bearer Request to the SGSN.

Step 709: The S-SGSN sends a Delete Bearer Response to delete the UE context.

Step 710: The ISR is deactivated in the SGSN side.

Figure 8:
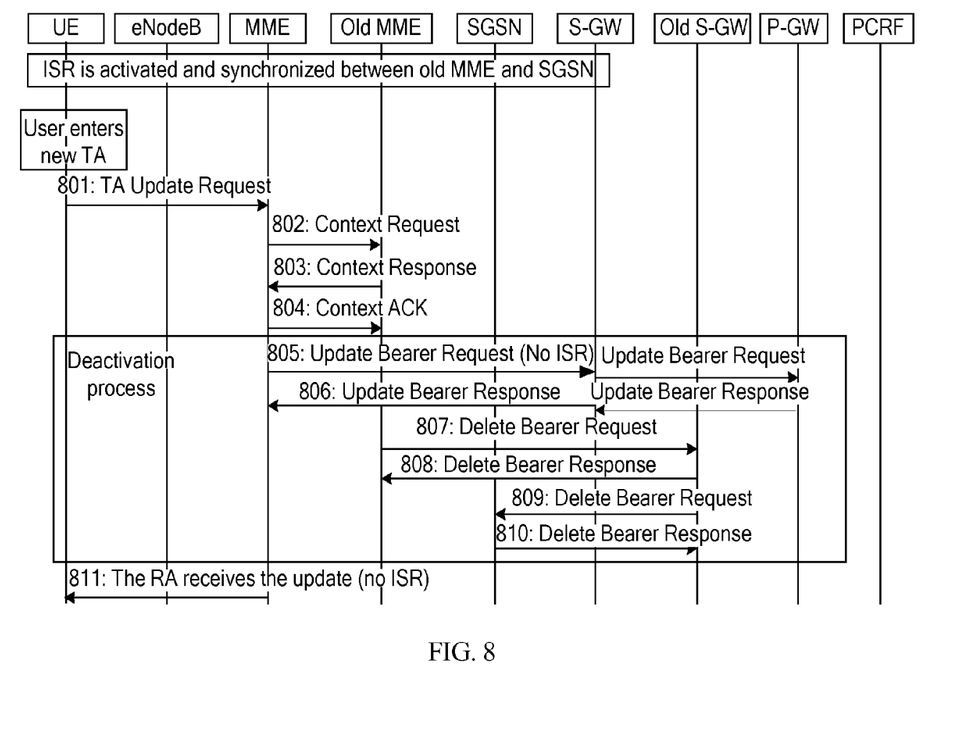
FIG. 8 provides a flowchart of method 2 of ISR activation described in embodiment 4 of the present invention.

FIG. 8 shows the specific ISR deactivation process when the S-GW changes, including the following steps:

Step 801: The UE connects to a new RAT node and sends a TA Update Request to the MME.

Step 802: The MME sends a Context Request for obtaining UE context from the old MME.

Step 803: The old MME returns a Context Response to the MME.

Step 804: The MME sends a Context Acknowledgment message to the old MME.

Step 805: The MME sends an Update Bearer Request to the S-GW. This message does not carry ISR information or carries information relating to ISR deactivation.

Step 806: The S-GW sends an Update Bearer Response to the MME.

Step 807: The old MME sends a Delete Bearer Request to the old S-GW.

Step 808: The old S-GW returns a Delete Bearer Response to the old MME.

Step 809: The old S-GW sends a Delete Bearer Request to delete the UE context from the SGSN.

Step 810: The SGSN returns a Delete Bearer Response to the old S-GW.

Step 811: The UE receives RAU Accept.

According to embodiments of the present invention, RAT1 node obtains context from the old node of RAT1 and triggers ISR deactivation when an ISR-activated UE connects to RAT1 node, so as to avoid the situation that RAT2 cannot obtain information relating to the new node of RAT1.

This embodiment relates to implementation of ISR deactivation. In addition to the periodical location update timer, the UE sets an ISR deactivation timer for each RAT; the periodical location update timer in UE side corresponds to the MRT in network side; the ISR deactivation timer in UE side corresponds to the timer 2 in network side (the network timer 2 in network side may be slightly longer than the deactivation timer in UE side). When the UE turns idle or switches to another network from an RAT, the corresponding RAT's MRT in network side and the periodical location update timer in UE side are started. When the UE updates location at the RAT or switches between RATs, the MRT in network side, the periodical location update timer in UE side, the timer 2 in network side, and the deactivation timer in UE side are all reset. When the periodical location update timer in UE side expires and the UE is camping on the corresponding RAT, the UE initiates a periodical location update for the RAT; if the periodical location update timer in UE side expires but does not camp on the corresponding RAT, and the ISR deactivation timer does not expire, the UE initiates location update when it returns the RAT. If the periodical location update timer in UE side for a certain RAT expires but the UE does not camps on the RAT, no location update request can be sent for the RAT, then the UE will initiate the deactivation timer for the RAT. When the MRT in network side expires and fails to receive the UE's location update request, timer 2 is started. Obviously, timer 2 in network side for a certain RAT and the deactivation timer in UE side can also be started the same way as a periodical location update timer when the UE turns idle or switches to another RAT. When the two RATs' MRTs in network side did not expire, the S-GW will send Downlink Data Notification to both the MME and SGSN. The MME and SGSN send a paging request to the UE. The RAT pages the UE. When a certain RAT's timer 2 does not expire but the MRT in network side expires, the UE will not be paged in the RAT if downlink data arrives; when the timer 2 in network side for a certain RAT expires, the network will deactivate ISR, delete UE mobility context, and detach the UE in the RAT.

When an RAT deactivation timer at the UE side also expires, the UE sets the RAT to detached status or deactivates ISR. When returning to the RAT, the UE carries the update type as "ISR synch" or a temporary identity assigned by another RAT, which will be mapped to the accessed RAT's identity in the location update message, enabling the RAT node to obtain context from another RAT node and update bearer information, or initiate an attach process. If both the two RAT deactivation timers expire, the UE initiates an attach process when getting access to a certain RAT.

In order to promptly detach an UE that have left a RAT, such as an UE without battery, when the network's MRT expires, the network sets the UE to "out of coverage" or semi-implicit detach. The network node MME or SGSN can notify the S-GW by sending an update message such as MRT Expiry Notification and Update Bearer Request. When the S-GW is aware that for both RATs, the MRTs in network side for the UE expire or the UE status is "out of coverage" or semi-implicit detached, an implicit detach process is initiated. If the S-GW receives MRT expiry information from RAT1 after a preset period of time, the S-GW does not send downlink data notification to RAT1 when receiving downlink data but sends the message to RAT2. Unless the UE moves to RAT1 again, for instance, the UE sends a location update message to RAT1's MME or SGSN node, the node resends UE movement notification to the S-GW, and if detach status or out of coverage notification has been sent previously, the S-GW will restore the UE status in the RAT to normal, as shown in FIG. 6, which illustrates ISR activation:

1) When the MRT of the MME or SGSN expires and the UE does not send a location update message, the corresponding MME or SGSN (after a preset time of period) sends UE MRT Expiry Notification or Update Bearer Request to the S-GW. The S-GW records the information. For example, it clears Paging Proceed Flag (PPF_MME) to indicate MME's MRT expiry, UE semi-detached for MME or UE out of LTE coverage; it clears PPF_SGSN to indicate that the UE's MRT in the SGSN expires, UE is semi-detached for SGSN or the UE is out of 2G/3G coverage. In this way, when RAT1 node sends the information, the S-GW does not send Downlink Data Notification to RAT1 node but to RAT2 when receiving downlink data. When both RAT nodes send the information to the S-GW, that is, both the MME and SGSN have "paging not allowed" flag, for example, PPF_MME and PPF_SGSN are cleared, and an implicit detachment process will be triggered.

2) When the MME or SGSN sends MRT expiry notification and the UE reconnects with the MME or SGSN again, for example, the UE sends a location update message or switches to the RAT, the MME or SGSN will send UE Active Notification or Update Bearer Request to the S-GW. The S-GW restores the status of the RAT for the UE, for example, the UE's PPF_MME or PPF_SGSN returns to normal. When receiving downlink data, the S-GW sends downlink data notification to the RAT to trigger paging. If a User plane is present, data will be sent directly.

In the foregoing embodiment, the deactivation timer is started when the periodical location update timer expires. In fact, the deactivation timer can be started together with the periodical location update timer and the former timer is longer than the latter. Similarly, timer 2 can be started together with the MRT, and the former timer is longer than the latter.

In Embodiment 5 of the present invention, if the ISR is activated, the UE camps on RAT1 for a long time and RAT2's ISR deactivation timer or MRT timer 2 expires, the UE or network will deactivate RAT2.

If the ISR is activated, the UE camps on RAT1 for a long time and is in idle mode, the S-GW needs to send downlink data notification to both the RAT1 and RAT2 when downlink data arrive. When the MRT timer for the UE does not expire, the RAT1 and RAT2 will both send a paging message. When the MRT of RAT2 expires, the RAT2 will not send a paging message, but there may be a large amount of downlink data notification/failure messages in the network. The benefit is just that the UE does not need to initiate an update request (before the MRT expires) when returning the RAT2. When the MRT expires, the UE always initiates an update request, thus causing a high signaling overhead.

Therefore, through IRS deactivation, the UE should be detached from RAT1 or RAT2 timely, including the following steps:

Step 901: A UE registers with a 2G/3G or SAE network, the UE retains a periodical location update timer. The UE and/or network also set a deactivation timer for RAT1 and RAT2 (the deactivation timer can also be a periodical location update timer, MRT timer or timer 2).

Step 902: When the UE in the RAT1 turns idle or switches to another RAT, or no periodical location update message is sent when the periodical location update timer in UE side expires, or the MRT in network side expires, the deactivation timer of RAT1 for the UE or network is started. When the UE gets access to the network in the RAT1, for example, location update, service request or switch back to the RAT1), the deactivation timer of the RAT stops or resets.

Step 903: When the UE's deactivation timer of the RAT1 in UE side expires, the UE is set to be detached from RAT1; when the UE's deactivation timer of the RAT1 in network side expires, the network sets the UE to be detached from RAT1. This process is also known as ISR deactivation. (The RAT1 can be either a 2G/3G or an SAE network).

If the UE's deactivation timer in network side expires, for example, the UE camps on E-UTRAN while the deactivation timer of 2G/3G expires, the SGSN or MME sends a Delete Bearer Request message to the S-GW, requesting the S-GW to delete the 2G/3G bearer. If both 2G/3G and SAE bearer information for the UE in the S-GW are deleted, the S-GW will initiate a deleting P-GW bearer request. Afterwards, the SGSN or MME deletes the UE's MM/SM context and sets the UE to "Detached".

When UE's deactivation timer of RAT1 in the UE side expires, the UE will set the RAT1 to detached state or deactivate ISR. At this time, if UE'sRAT2 in UE side is in registered state, when returning RAT1, the UE will carry the update type as "ISR synch" or a temporary identity assigned by RAT2 which will be mapped to the RAT1's identity in the location update message enabling the RAT1 node to obtain context from the RAT2 node and update bearer information or initiate an attach process. If deactivation timers the RAT1 and RAT2 both expire, both the RATs will be set detached, and then the UE will initiate an attach process when getting access to the RAT1 or RAT2 again.

Alternatively, if the UE camps on RAT1 for a long timer after ISR activation, and when the UE initiates a number of access attempts in the RAT1, such as service request or periodical location update, the periodical update counter counts each time the UE performs periodical update. When the periodical update counter reaches a preset threshold, the RAT1 triggers the deactivation of the RAT2. Specifically, the RAT1 node sends ISR deactivation information, such as Update Bearer Request (no ISR), to the S-GW, requesting the S-GW to delete the information relating to the RAT2. The S-GW sends Delete Bearer Request message to the RAT2 node, which detaches the UE locally in RAT2; alternatively, the RAT1 node sends ISR deactivation information, such as Detach Request, to the RAT2 node. Upon receiving the message, the RAT2 node sends Delete Bearer Request to the S-GW to delete the RAT2 bearer information from the S-GW.

The present embodiment sets a deactivation timer of first and second RAT for the UE and/or the network. When the network or UE deactivation timer of one RAT expires, the UE is promptly detached from the RAT. Alternatively, this embodiment sets a periodical location update counter of one RAT for the UE. When the counter reaches the preset threshold, the UE is detached promptly from the other RAT, as a result, needless paging and extra signaling is reduced.

Embodiment 6 herein provides a method of supporting ISR and permitting activation or maintaining ISR.

If some MME or SGSN that does not support ISR and the UE moves to another RAT, the S-GW cannot decide whether to create ISR with the previous RAT, thus causing the ISR creation failure if the UE registers with the MME or SGSN but the MME or SGSN does not send the information whether it supports ISR or not to the S-GW when it established the bearer.

Therefore, this embodiment provides a method of supporting ISR and permitting activation or maintaining ISR.

When the UE connects with RAT1's node, an MME or SGSN, the Create Bearer Request from the MME or SGSN to the S-GW carries information whether the MME or SGSN supports ISR and/or permits activating or retaining ISR information or not. For example, a Create Bearer Request or Update Bearer Request that carries the ISR parameter indicates that the MME or SGSN supports ISR and permits activating or retaining ISR.

When the UE connects to the RAT2 node (MME or SGSN), the node can carry the ISR parameter in an Update Bearer Request or Create Bearer Request, indicating that the node supports ISR and permits activating or retaining ISR.

Figure 9:
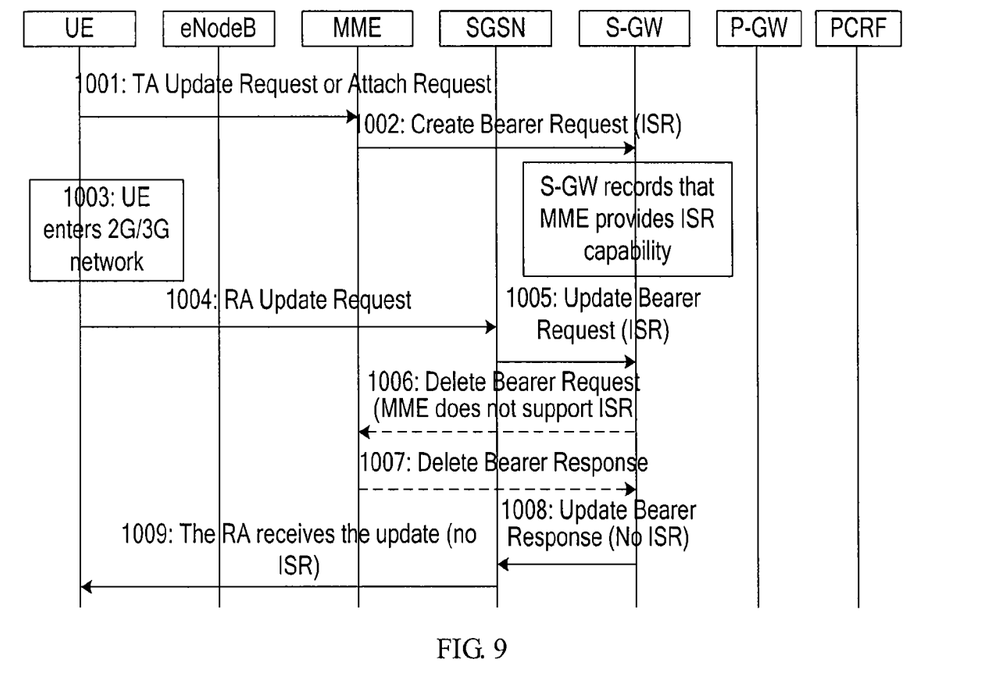
FIG. 9 provides a flowchart of a method of ISR activation/holding described in embodiment 6 of the present invention.

When the UE is connected to an MME or SGSN and the S-GW receives Update Bearer Request that carries ISR from the MME or SGSN, this indicates that the MME (or SGSN) node decides to retain or activate ISR. If the SGSN supports ISR, the SGSN (or MME) bearer will not be deleted. If the SGSN (or MME) does not support ISR or does not receive Update Bearer Request with ISR parameter, it will initiate a process of deleting the bearer of the SGSN (or MME). Specifically, the S-GW sends Delete Bearer Request to the SGSN (or MME). The SGSN (or MME) deletes related bearer and deactivates the ISR. When the S-GW deletes the SGSN (or MME), the returned Update Bearer Request can carry the indication that the ISR is not activated or retained (when the access point requires activation or ISR retention). Upon receiving the indication, the MME (or SGSN) returns a message that does not carry ISR activation flag or carries an ISR not activated flag to the UE. As shown in FIG. 9, the present embodiment includes the following steps:

Step 1001: A UE sends a TA update or attach request to the MME.

Step 1002: The MME sends Create Bearer Request to the S-GW, requesting that the message carries the ISR parameter, to indicate that the MME supports ISR and permits activating or retaining ISR.

Step 1003: The UE enters the 2G/3G network.

Step 1004: The UE sends an RA update request to the SGSN.

Step 1005: The SGSN sends Update Bearer Request to the S-GW. Likewise, the SGSN also needs to carry information in the update bearer request to indicate whether to support ISR and permit activating or retaining the ISR or not.

If the S-GW remains unchanged and the SGSN retains or activates ISR, the S-GW can create ISR. If the S-GW changes, no ISR can be created. If the SGSN's Create Bearer Request carries information that indicates ISR is not supported, the SGSN does not support or prepare to create ISR. Thus, the S-GW does not create ISR. If the MME carries information in Step 1002 that indicates ISR is not supported, the S-GW does not create ISR. If no ISR is created, the process proceeds to the following steps:

Step 1006: The S-GW sends Delete Bearer Request message to the MME, because the MME or SGSN does not support ISR or the SGSN does not prepare to create ISR.

Step 1007: The MME sends Delete Bearer Response to the S-GW.

Step 1008: The S-GW sends update bearer response to the SGSN.

When the S-GW deletes the MME bearer, the returned Update Bearer Request can carry the indication that the ISR is not activated or retained. Upon receiving the indication, the SGSN returns a message that does not carry ISR activation flag or carries an ISR not activated flag to the UE; and Step 1009: The SGSN sends Accept RA Update to the UE.

When the MME or SGSN node receives a message that indicates ISR is not supported, such as "ISR not activated", "ISR cannot be activated or retained", from the S-GW, the node will not send ISR activation flag to the UE. Otherwise, the MME or SGSN node sends ISR activation flag to the UE.

According to embodiments of the present embodiment, the S-GW is notified with respect to whether the S-GW supports or permits ISR activation, when the MME or SGSN creates bearer with the S-GW. The S-GW accurately determines whether to activate or maintain ISR. This prevents the S-GW from deactivating, due to the reason that some nodes do not support the functionality, ISR again. As a result, the signaling overload is reduced and network resources are saved.

Embodiment 7 provides a method of selecting NAS node or S-GW described.

Figure 10:
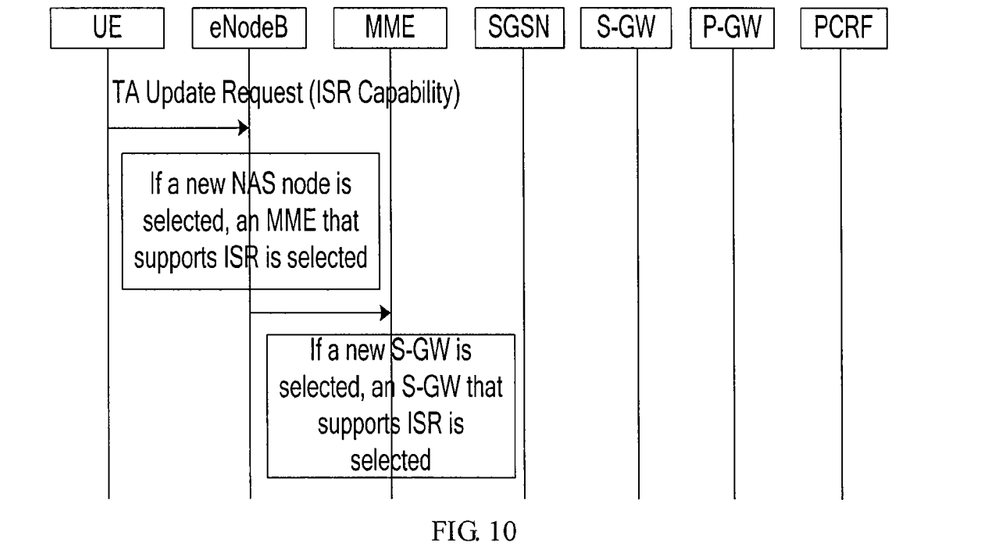
FIG. 10 provides a flowchart of a method of selecting NAS node or S-GW described in embodiment 7 of the present invention.

Current networks have NAS node or S-GW that does not support ISR, such as MME or SGSN. In order to activate ISR for a UE that supports ISR, NAS node and S-GW that supports ISR should be selected. Otherwise, ISR cannot be activated to reduce signaling overhead. FIG. 10 shows an ISR-enabled UE connects to a network. If the UE enters a new TA or RA, it initiates TAU, RAU or Attach process. The UE carries ISR capability in the RRC part. When an RAN node, such as eNodeB, needs to select a new NAS node, an NAS node such as MME or SGSN, that supports ISR will be selected depending on whether the UE provides ISR capability.

Depending on whether the UE provides ISR capability or the area where the UE is camping on, an S-GW is selected, for example, obtaining information such as whether to approach another RAT from the UE's RAN node, and ISR-enabled S-GW is preferable.

A device for RAT ISR deactivation is provided in an embodiment of the present invention, including:

a deactivation unit, adapted to be used by the network of the first RAT to deactivate ISR of a UE when Timer 2 for the first RAT of the current network expires; or a setting unit, adapted to be used by a UE to set the first RAT to be detached or ISR deactivation status when the UE's first RAT deactivation timer expires.

A system for implicit detachment is provided in an embodiment of the present invention, including:

a second device, adapted to send a request message that carries implicit detachment indication to a first device; and the first device, adapted to receive a request message from the second device and perform implicit detachment according to the indication;

where the first device includes:

a receiving unit, adapted to receive a request message from the second device; and a judging unit, adapted to determine whether the request message carries timer expiry indication; if such indication is present, implicit detachment is preformed.

The first device is S-GW and the second devices are RAT1 and RAT2 network node, wherein MME is the network node for RAT1, while SGSN is the network node for RAT2.

A device for implicit detachment is provided in an embodiment of the present invention, including:

a recording unit, adapted to record whether the request message carries implicit detachment indication; and a detection unit, adapted to perform implicit detachment or restore the original status according to the detection indication.

It is understandable to those skilled in this art that all or part of the processes of the methods set forth in the foregoing embodiments can be implemented by a computer program giving instructions to related hardware. The program can be stored in computer readable storage media. When executed, the program may comprise processes for embodiments of the foregoing methods. Wherein, the storage media can be disks, compact disks, Read-Only Memory (ROM) or Random Access Memory (RAM). The sequence number of the embodiments does not represent the preference of the embodiments.

Lastly, although the invention is described through some exemplary embodiments, the invention is not limited to such embodiments. Those skilled in the art can make various modifications or variations to the invention without departing from the spirit and scope of the invention.

What is claimed is:

1. A method of network operation, comprising:
    setting, by a user equipment (UE), a deactivation timer for a first radio access technology (RAT) network;
    starting, by the UE, the deactivation timer when a periodic location update timer for the first RAT network in the UE expires, if an idle state signaling reduction (ISR) is activated and the UE does not camp on the first RAT network;
    deactivating, by the UE, the ISR upon expiration of the deactivation timer; and
    re-accessing, by the UE, the first RAT network with a temporary identity assigned by the second RAT network after the ISR is deactivated and when the UE is registered with a second RAT network.

2. The method according to claim 1, further comprising:
setting, by the UE, an additional deactivation timer for a second RAT network.

3. The method of claim 1, further comprising:
resetting, by the UE, the deactivation timer upon the UE re-accessing the first RAT network.

4. The method according to claim 1, wherein the periodic location update timer comprises a routing area update (RAU) timer.

5. The method of claim 1, wherein the deactivating the ISR comprises: setting, by the UE, a status of the ISR to a deactivation status upon expiration of the deactivation timer.

6. The method of claim 1, wherein the first RAT network comprises a second-generation (2G) radio communication network, a third-generation (3G) radio communication network, a long term evolution (LTE) network, or a system architecture evolution (SAE) network.

7. The method of claim 1, wherein when the UE is detached in both the first RAT network and a second RAT network after the ISR is deactivated, the method further comprises:
re-accessing, by the UE, one of the first RAT network and the second RAT network; and
performing an attach process.

8. The method of claim 1, wherein the method further comprises:
determining, by the UE, that a periodic location update message cannot be sent before starting the deactivation timer.

9. The method of claim 1, wherein the deactivating the ISR comprises:
setting the UE to be detached in the first RAT network.

10. A user equipment (UE), comprising:
a memory storing instructions; and
a processor coupled to the memory, wherein when the processor executes the instructions, the instructions instruct the processor to:
set a deactivation timer for a first radio access technology (RAT) network;
start the deactivation timer when a periodic location update timer for the first RAT network in the UE expires, if an idle state signaling reduction (ISR) is activated and the UE does not camp on the first RAT network;
deactivate the ISR upon expiration of the deactivation timer; and
re-access the first RAT network with a temporary identity assigned by the second RAT network after the ISR is deactivated and when the UE is registered with a second RAT network.

11. The UE of claim 10, wherein the instructions further instruct the processor to set an additional deactivation timer for the second RAT network.

12. The UE of claim 10, wherein the instructions further instruct the processor to reset the deactivation timer upon the UE re-accessing the first RAT network.

13. The UE of claim 10, wherein the periodic location update timer comprises a routing area update (RAU) timer.

14. The UE of claim 10, wherein the first RAT network comprises a second-generation (2G) radio communication network, a third-generation (3G) radio communication network, a long term evolution (LTE) network, or a system architecture evolution (SAE) network.

15. The UE of claim 10, wherein the instructions further instruct the processor to:
re-access one of the first RAT network and the second RAT network; and
perform an attach process after the ISR is deactivated and when the UE is detached in both the first RAT network and a second RAT network.

16. The UE of claim 10, wherein the instructions further instruct the processor to determine that a periodic location update message cannot be sent before starting the deactivation timer.

17. The UE of claim 10, wherein the instructions further instruct the processor to set the UE to be detached in the first RAT network.

* * * * *